(No Model.)

P. WIEDERER.
ORNAMENTAL MIRROR.

No. 250,028. Patented Nov. 22, 1881.

Witnesses
Otto Hufeland
William Miller

Inventor
Peter Wiederer
by Van Santvoord & Hauff
his att'ys

United States Patent Office.

PETER WIEDERER, OF NEW YORK, N. Y.

ORNAMENTAL MIRROR.

SPECIFICATION forming part of Letters Patent No. 250,028, dated November 22, 1881.

Application filed July 9, 1881. (No model.)

*To all whom it may concern:*

Be it known that I, PETER WIEDERER, a subject of the German Empire, residing at New York, in the county and State of New York, have invented new and useful Improvements in Ornamental Mirrors, of which the following is a specification.

My invention relates to glass mirrors for framing or other purposes, and especially that class of glass mirrors embodying a back plate of transparent glass illuminated by a picture or other similar object which is arranged beneath it.

My invention consists in fastening the transparent glass back plate to the glass mirror-plate by means of a layer of cement interposed between the two plates at or near their edges.

A transparent glass plate, having a picture or the like arranged beneath it, has heretofore been fastened to the back of a glass mirror-plate by means of a binding-strip of leather or other similar material cemented to the edges of the plates; but this fastening is not practically adapted to a mirror for framing, because considerable labor and skill are required to apply the binding-strip, and a waste of material is incurred, all tending to raise the cost of manufacturing the article unwarrantably, the binding-strip, moreover, being liable to become detached by handling.

In the mirror obtained by my invention the back plate is securely fastened to the mirror-plate with the least possible labor, without waste, and without the exercise of any skill, so that the cost of the article is reduced to a minimum.

Figure 1:
Figure 2:
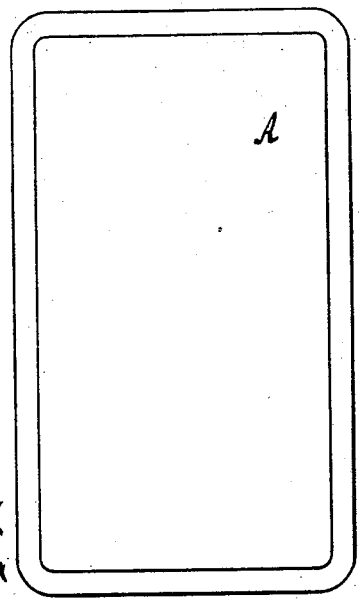
Figure 3:
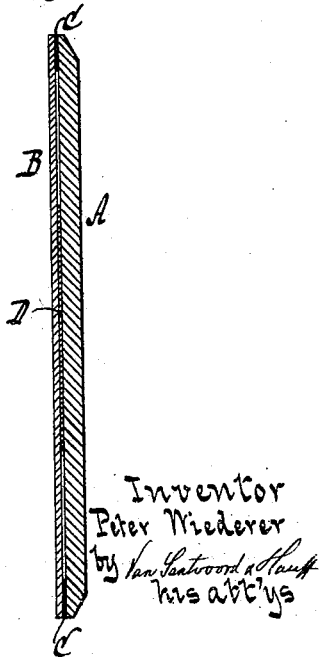

My invention is illustrated in the accompanying drawings, in which Figure 1 represents a back view. Fig. 2 is a front view. Fig. 3 is a longitudinal cross-section.

Similar letters indicate corresponding parts.

The letter A designates the glass mirror-plate; B, the transparent glass back plate, and C the layer of cement whereby the plates are fastened together.

In carrying out my invention I put the picture on the inner surface of the back plate, B, by securing thereon a piece of paper, D, containing the picture, and I then usually coat this surface of the plate with a pigment to form a background for the picture. When the pigment has dried I place on the inner surface of the back plate, at or near its edges, or on a corresponding portion of the inner surface of the mirror-plate A, the layer of cement C, consisting of dissolved resin or other suitable material; I then bring the two plates in contact, with their inner surfaces facing each other, and when the cement has dried the article is ready for use.

The frame used for holding my improved mirror is open on both sides, thus exposing both the reflecting-face and the illuminated back.

I am aware that in preparing photographic pictures a glass transparent plate has been covered uniformly over its surface with a compound of wax, rectified spirits of turpentine, and gum heated to a fluid state, a photograph or engraving being placed on said heated fluid mixture, and a second glass plate applied upon the photograph or engraving, after which pressure is applied to the two plates to expel the air and excess of mixture, for the purpose of rendering the paper containing the design transparent to form a medium for the transmission of color, which is applied to the back of the first-mentioned glass plate. I am also aware that the reflecting-coating on the rear face of a glass mirror has been prepared to receive a photographic picture, the reflecting-surface serving as a backing to the picture. Such inventions, however, are not claimed by me, and do not constitute the features invented by me.

What I claim as new, and desire to secure by Letters Patent, is—

As an improved article of manufacture, the mirror herein shown and described, consisting of the glass mirror-plate A and the back plate, B, of transparent glass, illuminated with a picture or similar object, the two plates being connected together at or near the outer edges by an interposed narrow layer of cement, all essentially as set forth.

In testimony whereof I have hereunto set my hand and seal in the presence of two subscribing witnesses.

PETER WIEDERER. [L. S.]

Witnesses:
WILLIAM MILLER,
CHAS. WAHLERS.